United States Patent
Andoh et al.

(10) Patent No.: US 6,212,234 B1
(45) Date of Patent: Apr. 3, 2001

(54) COLOR IMAGE ENCODING APPARATUS AND COLOR IMAGE DECODING APPARATUS

(75) Inventors: Akihiro Andoh; Taro Yokose, both of Nakai-machi (JP)

(73) Assignee: Fuji Xerox Co., Ltd., Tokyo (JP)

( * ) Notice: Subject to any disclaimer, the term of this patent is extended or adjusted under 35 U.S.C. 154(b) by 0 days.

(21) Appl. No.: 09/079,188

(22) Filed: May 15, 1998

(30) Foreign Application Priority Data

Jun. 4, 1997 (JP) .................................................. 9-146864

(51) Int. Cl.[7] ........................................................ H04B 1/66
(52) U.S. Cl. ...................... 375/240.08; 348/384; 382/243
(58) Field of Search .................................... 348/384, 390, 348/411, 412, 413, 414; 375/240.08–240.09; 382/234, 236, 238, 239, 162, 164, 243; H04N 7/12, 7/32

(56) References Cited

U.S. PATENT DOCUMENTS

| | | | |
|---|---|---|---|
| 5,764,804 | * | 6/1998 | Yajima et al. ......................... 382/238 |
| 5,838,826 | * | 11/1998 | Enari et al. ........................... 382/234 |
| 5,907,361 | * | 5/1999 | Okada ............................. 375/240.08 |
| 5,909,505 | * | 6/1999 | Katayama et al. .................... 382/164 |
| 5,956,430 | * | 6/1998 | Kunitake et al. ................ 375/240.08 |
| 5,978,515 | * | 11/1999 | Katata et al. ......................... 382/243 |

FOREIGN PATENT DOCUMENTS 9-224253   8/1997 (JP) .

* cited by examiner

*Primary Examiner*—Howard Britton
*Assistant Examiner*—Nhon T Diep
(74) *Attorney, Agent, or Firm*—Oliff & Berridge, PLC

(57) ABSTRACT

A color image of a dot-sequential system is converted into a color image of a field-sequential system and a color image can be encoded/decoded at a high speed with a high compression ratio. A pixel value of image data of a dot-sequential system is sequentially inputted to a reference area generating means, and the reference area generating means outputs target pixel data and reference area data. A same pixel value distributing and generating means generates and outputs a same pixel value distribution from the target pixel data and the reference area data. A predictive information encoding means encode data in accordance with an encoding generating table, and outputs predictive information encoded data and an encoding result signal. A dot-sequential/field-sequential image converting means converts pixel data of dot-sequential system into image data of field-sequential system when data cannot be encoded. A predictive error calculating means calculates and outputs a predictive error based on a pixel value data of field-sequential system. A predictive error encoding means encodes a predictive error, for example, in an arithmetic coding fashion.

8 Claims, 17 Drawing Sheets

Reference area data → Same pixel value distribution generating processing → Same pixel value distribution

308

| C | B | D |
|---|---|---|
| A |   |   |

309

| Reference pixels | | | | Predictive information code | Encoded result signal |
|---|---|---|---|---|---|
| A | B | C | D | | |
| 1 | – | – | – | 1 | 0 |
| 0 | 1 | – | – | 01 | 0 |
| 0 | 0 | 1 | – | 001 | 0 |
| 0 | 0 | 0 | 1 | 0001 | 0 |
| 0 | 0 | 0 | 0 | 0000 | 1 |

Fig. 6
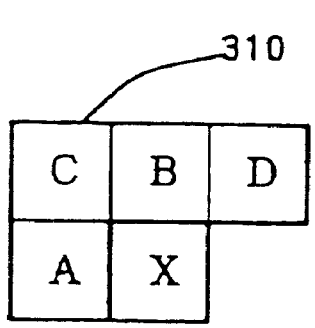 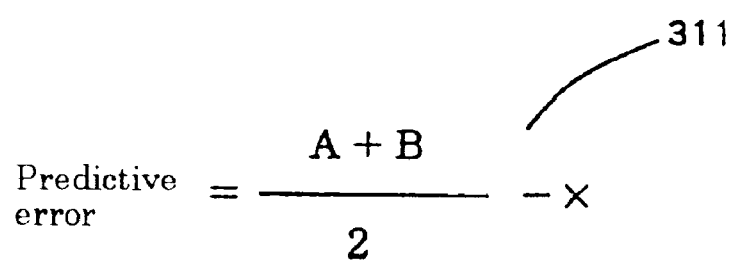

COLOR IMAGE ENCODING APPARATUS AND COLOR IMAGE DECODING APPARATUS

BACKGROUND OF THE INVENTION

1. Field of the Invention

The present invention relates to a technology for encoding/decoding an image, in particular, a color image.

2. Description of the Prior Art

Recently, color documents are rapidly widespread, and a data amount of documents is increasing several times the data amount of the past. Therefore, in order to reduce document input and output times, there is requested a color image compression coding system for compressing color image data at a high speed with a high compression ratio.

There are available a color image expression system in which image data is separated per color element such as K (black), Y (yellow), M (magenta), C (cyan) and expressed (this system will hereinafter be referred to as a field-sequential system) and a color image expression system in which image data is not separated per color element and expressed (this system will hereinafter be referred to as a dot-sequential system). These examples will be described with reference to memory areas 701 and 700 of FIG. 15. In the example of the field-sequential system expressed by the memory area 700, R (red) signal data, G (green) signal data and B (blue) signal data are memorized separately. In the example of the dot-sequential system expressed by the memory area 701, an R pixel value, a set of a G pixel value and a B pixel value expressing pixels are memorized at memory locations corresponding to the pixel positions of image. Data expressed by the dot-sequential system is read out as it is and processed when it is displayed on a CRT (cathode-ray tube) in a dot-sequential system. According to the dot-sequential system, an image can be drawn at a high speed and the dot-sequential system is widely used on a computer. On the other hand, an electrostatic photography color printer executes an electrostatic photography process at every element. Accordingly, the field-sequential system is widely used in this kind of color printer. For this reason, it is frequently observed that an image of a dot-sequential system handled by the computer is outputted by a field-sequential system printer.

A conventional example in which a dot-sequential system image is outputted by a field-sequential system printer will be described below. In the following description, a color image comprises four colors of K, Y, M, and C.

CONVENTIONAL EXAMPLE 1

FIG. 16 shows the manner in which a color image is outputted to a color printer by use of an image encoder and a decoder both of a conventional type. In this example, inputted dot-sequential color image is converted into a field-sequential system color image, and each field is encoded/decoded as a gray-scale image, and outputted to the printer of field-sequential system. The dot-sequential/field-sequential conversion is executed by a central processing unit (CPU).

In FIG. 16, reference numeral 100 denotes an encoder for encoding image data, 101 a decoder for decoding encoded image data, 103 a storage/playback work memory, 104 a hard disk (HDD) for temporarily storing encoded image, 105 a color printer for inputting and outputting an image in the field-sequential system, and 108 a CPU for controlling this system. Reference numeral 200 denotes a system bus for connecting each module in this system.

In FIG. 16, when an image is outputted to the printer, the work is separated into two processes of first-stage processing and second-stage processing. The first-stage processing covers the processing executed until an image is stored in the HDD 104, and has the following procedure. Let it be assumed that an image outputted to the color printer 105 is already stored in the memory 103. The CPU 108 converts a dot-sequential system image into a field-sequential system image. FIG. 17 shows the contents of the conversion work. Let us consider the case in which a dot-sequential system image is stored in a memory area 810 on the memory with each of K, Y, M, C fields being of 8 bits and 32 bits in total, converted into K, Y, M, C fields, and stored in memory areas 816, 817, 818, 819 on the memory, respectively. The CPU 108 reads out a value 811 of one pixel of 32-bit width from the memory area 810, decomposes the same into four of element data 812, 813, 814, 815 by 8 bits each from the high-order bit sequentially, and regard them as pixels of K, Y, M, C fields. Finally, the CPU 108 writes the element data 812, 813, 814, 815 of 8-bit width in corresponding memory areas 816, 817, 818, 819. When this work is effected on all pixels by scanning the address positions of the memory areas 810, 816, 817, 818, 819 as shown by arrows 820, 821, the image is converted from the dot-sequential system into the field-sequential system. Since the image of field-sequential system is generated, the CPU 108 informs the fact that the image data is prepared in the memory 103 through the bus 200 to the encoder 100. The encoder 100 reads out image data from all of the four fields of K, Y, M, C, encodes the same and writes encoded image encoding data through the bus 200 in the memory 103, and informs the completion of the encoding through the bus 200 to the CPU 108. The CPU 108 informs the fact that image data of all fields of Y, M, C, K are all prepared in the memory 103 to the HDD 104 through the bus 200. The HDD reads out image encoding data of all fields of Y, M, C, K through the bus 200 and stores the same inside. The above-mentioned processing is repeated until output image data is gone. Normally, the repeated processing is executed by the unit of one page.

The second-stage processing is executed until image data is outputted from the HDD 104 to the color printer 105, and its procedure is as follows. The CPU 108 issues a command through the bus 200 to the HDD 104 in such a manner that HDD 104 reads out image encoding data of all fields of the Y, M, C, and K. The HDD 104 reads out the image encoding data, outputs the image encoding data through the bus 200 to the memory 103 and informs the fact that the reading of the image encoding data is finished through the bus 200 to the CPU 108. The CPU 108 outputs the fact that the image encoding data is prepared in the memory 103 through the bus 200 to the decoder 101. The decoder 101 reads out the image encoding data through the bus 200, decodes the same, writes the decoded image data through the bus 200 in the memory 103, and informs the fact that the decoding is finished through the bus 200 to the CPU 200. Then, the CPU 108 informs the fact that the image data is prepared in the memory 103 through the bus 200 to the color printer 105. The color printer 105 outputs the out image data thus read through the bus 200. Similarly to the first-stage processing, the above-mentioned processing is repeated until outputted data is gone.

An image encoding system of the encoder 100 may be an encoding system which can encode and decode image data of field-sequential system. Herein, a drawing direction predictive encoding system (Japanese Patent Application No. Hei 8-31074) that has been proposed by the assignee of the present application. As shown in FIG. 2, according to this drawing direction predictive encoding system, when a pixel is encoded by scanning image data 301 as shown by an arrow 303, the encoding is carried out by predicting the drawing direction. As shown in FIG. 3, for example, a pixel 305 around an encoded pixel (target pixel) 304 is referred to. If the target pixel 304 and the reference pixel 305 are arranged in a pixel value group 306 shown in FIG. 4, a same pixel distribution 307 is generated. In this same pixel value distribution, 0 indicates disagreement, and 1 indicates agreement. On the basis of this same pixel distribution, there is labeled a reference pixel value (A, B, C, D) shown in FIG. 5, for example, and codes shown on a table 309 are generated. The codes thus generated are called predictive information codes. If none of the target pixels and the reference pixels agrees, in addition to the predictive information code indicating the disagreement, a predictive error expressed by a calculation equation 311 is encoded by the labeling of a reference pixel (A, B, C, D) 310 shown in FIG. 6, for example. Then, the predictive information code and the predictive error code are collected and then outputted as an encoded result. In order to improve a compressing ratio, the predictive information code and the predictive error code may further be encoded by using a run length code and an arithmetic code, for example. Alternatively, it is acceptable that the predictive information code is not prepared as a static table but dynamically changed in response to the feature of the image.

CONVENTIONAL EXAMPLE 2

The conventional example 2 will be described with reference to FIG. 18. In FIG. 18, elements and parts identical to those of FIG. 16 are marked with the same reference numerals. In FIG. 18, similarly to the first conventional example 1, a color image is outputted to the color printer by use of an image encoder and a decoder both of a conventional type. The conventional example 2 differs from the conventional example 1 in two points: the encoder 100, the decoder 101 and the hard disk 104 are connected in parallel by as many as the number of the fields of the color element images; and a dot-sequential/field-sequential converter 109 is added. According to the above-mentioned arrangement, as compared with the conventional example 1, the encoding and decoding processing times can be reduced considerably.

In FIG. 18, when an image is outputted to a printer, the work is divided into a first-stage processing and a second-stage processing.

The first-stage processing is executed until image data is accumulated in the HDD 104, and its procedure is substantially similar to that of the conventional example 1. The first-stage processing is different in that the four encoders 100 read and write image data according to the field-sequential system. Further, when encoded data is read out, the dot-sequential/field-sequential image converter 109 converts an address of image data. For example, when the encoder 100K reads out image data, an image data address is outputted through the port 109K. While the encoder 100K outputs an address of image data so that image data of the field-sequential system in which a start address S and transfer length L bytes are continuous are read out, the dot-sequential/field-sequential image converter 109 converts address in such a manner that discontinuous data of start address S and transfer length L bytes are read out. To be concrete, the address is converted so that, after data of one byte is read out, the data of the next 3 bytes is not read out. FIG. 19 shows the converted address. A memory space 111 is the address required by the encoder 100K, and a memory space 112 is the address converted by the dot-sequential/field-sequential image converter 109. The memory space 112 is the address in which K field is stored, wherein the address is converted accurately. This is also true in the other encoders 100Y, 100M and 100C. The writing of image encoded data need not be delayed until the encoding of all fields is finished, and started from the completed field. Similarly to the encoders, there are provided four HDD 104, i.e. an HDD 104K, an HDD 104Y, an HDD 104M and an HDD 104C are corresponding to K, Y, M and C fields, respectively. Thus, the dot-sequential/field-sequential conversion and the encoding can be carried out simultaneously.

The second-stage processing is executed until image data is outputted from the HDD 104 to the printer, and is substantially similar to that of the conventional example 1. The succeeding stage is different from that of the conventional example 1 in that the processing time is reduced by setting the decoder 101 and the hard disk 104 connected in parallel to each other.

The conventional example 1 encounters with the following problems:
(1) Image conversion load is large:
When image data of the dot-sequential system is outputted to the color printer of the field-sequential system, image data should be once converted into image data of the field-sequential system. Calculating a load required when a dot-sequential image is converted into a field-sequential image, when an image of 400 pixels/25.4 mm and 32 bits/pixel (totally, 8 bits each for KYMC) is outputted on A4-size printing paper at one sheet/second, an image should be converted from the dot-sequential system to the field-sequential system at 60 MB/second. This is considered to be a very large load for a PC (personal computer) considering that an efficiency of a CPU which is now a mainstream of PC is about 200 MIPS and that a peak efficiency of bus is about 130 MB/second.

The following problems are common to the conventional examples 1 and 2:
(2) An encoding amount increases in proportion to the increase of the number of fields.
In both of the conventional examples 1 and 2, since the image of dot-sequential system is converted into the image of the field-sequential system, the encoding of the gray scale image is simply applied to each field so that the encoding using a correlation between the field and the field cannot be carried out. Accordingly, the encoding amount becomes so large that not only the number of pages of documents that can be accumulated in the hard disk is reduced but also the input and output times of image become large.

SUMMARY OF THE INVENTION

In view of the aforesaid aspect, it is an object of the present invention to provide a color image encoding apparatus and a color image decoding apparatus in which image data can be encoded/decoded at a high speed with a high compression ratio while a color image of the dot-sequential system is converted into a color image of the field-sequential system.

According to the present invention, in order to achieve the above-mentioned object, in a color image encoding apparatus for encoding first color image data (image data of the dot-sequential system) which is not divided per color element but handled as single data in such a manner that the first color image data can be decoded as second color image data (image data of the field-sequential system) which is handled as a plurality of data sets for respective color elements, the color image encoding apparatus comprises reference area generating means for collecting a color pixel value of a target pixel to be encoded and a plurality of color pixel values at a peripheral region of the color pixel value by scanning the first color image data and outputting these color pixel values as reference area data, same pixel distributing and generating means for detecting on the basis of the reference area data the manner in which pixels having the same color pixel value as that of the target pixel are distributed around the target pixel and generating a detected result as the same pixel value distribution, predictive information encoding means for determining pixel value predictive information based on the pixel value distribution and outputting the pixel value predictive information as a predictive information code, pixel value converting means for converting the pixel value of the first color image data into a pixel value per color element and outputting a target pixel value per color element, pixel value predicting means for predicting a target pixel value per color element to be encoded from pixel values of corresponding color elements within a reference area and outputting the target pixel value as a predictive pixel value per color element, predictive error calculating means for calculating and outputting a predictive error between a target pixel value per color element and a predictive pixel value of the corresponding color element, and predictive error encoding means for encoding a predictive error per color element and outputting the encoded predictive error as a predictive error code.

According to the above-mentioned arrangement, since the dot-sequential/field-sequential image conversion is not carried out as the pre-processing of the encoding but processed at a high speed as the internal processing of the encoder, the encoding processing time can be reduced. Further, since the detection of the same pixel value distribution and the predictive information encoding are carried out one at a time independently of the number of fields of the image, the encoding processing time can be reduced. Further, since the predictive information encoding has only one field amount independently of the number of fields of the image, it can be expected that an encoding amount can be reduced. Furthermore, since there are only one reference area generating means, one same pixel value distributing and generating means and one predictive information encoding means independently of the number of fields of image, the circuit arrangement can be simplified.

Further, according to the present invention, in order to achieve the above-mentioned object, in a color image decoding apparatus for receiving a code generated by the image encoding apparatus as an input signal and decoding the code into second color image data handled as a plurality of data sets for respective color elements, the color image decoding apparatus comprises predictive information decoding means for decoding an inputted predictive information code and outputting the decoded inputted predictive information code as predictive information, pixel value predicting means provided per color element and predicting a target pixel value from the predictive information and a pixel value of a reference area to output the predictive target pixel value as a predictive pixel value, predictive error decoding means provided per color element and decoding an inputted predictive error code to output the decoded inputted predictive error code as a predictive error, and predictive error adding means provided per color element and adding the predictive pixel value and the predictive error to output an added value as a target pixel value.

According to the above-mentioned arrangement, there can be decoded a code which was previously encoded by the color image encoding apparatus.

Further, the above-mentioned image data encoding apparatus may further comprise means for designating the number of color elements of the first color image data and means for converting the pixel value of the first color image data into pixel value corresponding to a maximum color element number when the designated color element number does not reach the maximum color element number that can be decoded.

Further, according to the present invention, in order to achieve the above-mentioned object, in a color image encoding apparatus for encoding first color image data which is not divided per color element but handled as single data in such a manner that the first color image data can be decoded as second color image data which is handled as a plurality of data sets for respective color elements, the color image encoding apparatus comprises predictive encoding means for predicting target pixels to be encoded of the first color image data by a plurality of predicting devices and outputting identification data of a selected predicting device selected based on a predicted result, pixel value converting means for converting a value of the target pixel to be encoded of the first color image data into a pixel value per color element and outputting a target pixel value to be encoded per color element when any one of the plurality of predicting devices is not selected, pixel value predicting means for predicting a target pixel value to be encoded per color element and outputting a predictive pixel value of the color element, predictive error calculating means for calculating and outputting a target pixel value to be encoded per color element and a predictive pixel value per corresponding color element, and means for outputting encoded data based on identification data of the selected predicting device and a predictive error per color element.

According to the above-mentioned arrangement, since the dot-sequential/field-sequential image conversion is not carried out as the pre-processing of the encoding and processed at a high speed as the internal processing of the encoder, the encoding processing time can be reduced. Further, since the detection of the same pixel value distribution and the predictive information encoding are carried out one at a time independently of the number of fields of the image, the encoding processing time can be reduced. Further, since the predictive information encoding has only one field amount independently of the number of fields of the image, it can be expected that an encoding amount can be reduced. Furthermore, since there are only one reference area generating means, one same pixel value distributing and generating means and one predictive information encoding means independently of the number of fields of image, the circuit arrangement can be simplified.

According to the above-mentioned arrangement, the plurality of encoders predict pixels near the target pixel to be encoded as pixels to be encoded. Further, a prediction order of the predicting device may be used as identification data of the predicting device. Furthermore, the prediction order sequence may be encoded by a run-length-code.

Furthermore, according to the present invention, in order to achieve the above-mentioned object, in a color image encoding method of encoding first color image data which is not divided per color element but handled as single data in such a manner that the first color image data can be decoded as second color image data which is handled as a plurality of data sets for respective color elements, the color image encoding method comprises the steps of a predictive encoding step for predicting target pixels to be encoded of the first color image data by a plurality of predicting devices and outputting identification data of a selected predicting device selected based on a predicted result, a pixel value converting step for converting a value of the target pixel to be encoded of the first color image data into a pixel value per color element and outputting a target pixel value to be encoded per color element when any one of the plurality of predicting devices is not selected, a pixel value predicting step for predicting a target pixel value to be encoded per color element and outputting a predictive pixel value of the color element, a predictive error calculating step for calculating and outputting a target pixel value to be encoded per color element and a predictive pixel value per corresponding color element, and a step for outputting encoded data based on identification data of the selected predicting device and a predictive error per every color element.

According to the above-mentioned arrangement, the encoding time can be reduced, the efficient encoding can be realized, and the arrangement can be simplified.

BRIEF DESCRIPTION OF THE DRAWINGS

FIG. 6 is a diagram used to explain the manner in which predictive error is calculated;

DESCRIPTION OF THE PREFERRED EMBODIMENTS

The present invention will hereinafter be described in detail. Initially, a summary of the present invention will be described. The present invention has the following two characteristics:

(1) Since the dot-sequential/field-sequential image conversion is not carried out as the pre-processing of the encoding but carried out as the internal processing of the encoder and a time required by the dot-sequential/field-sequential conversion can be reduced; and (2) Pixel values are not compared per field but pixel values of all fields are compared with each other in the dot-sequential system, thereby reducing the number of comparing the pixel values and the number of predictive information encoding.

Figure 1:
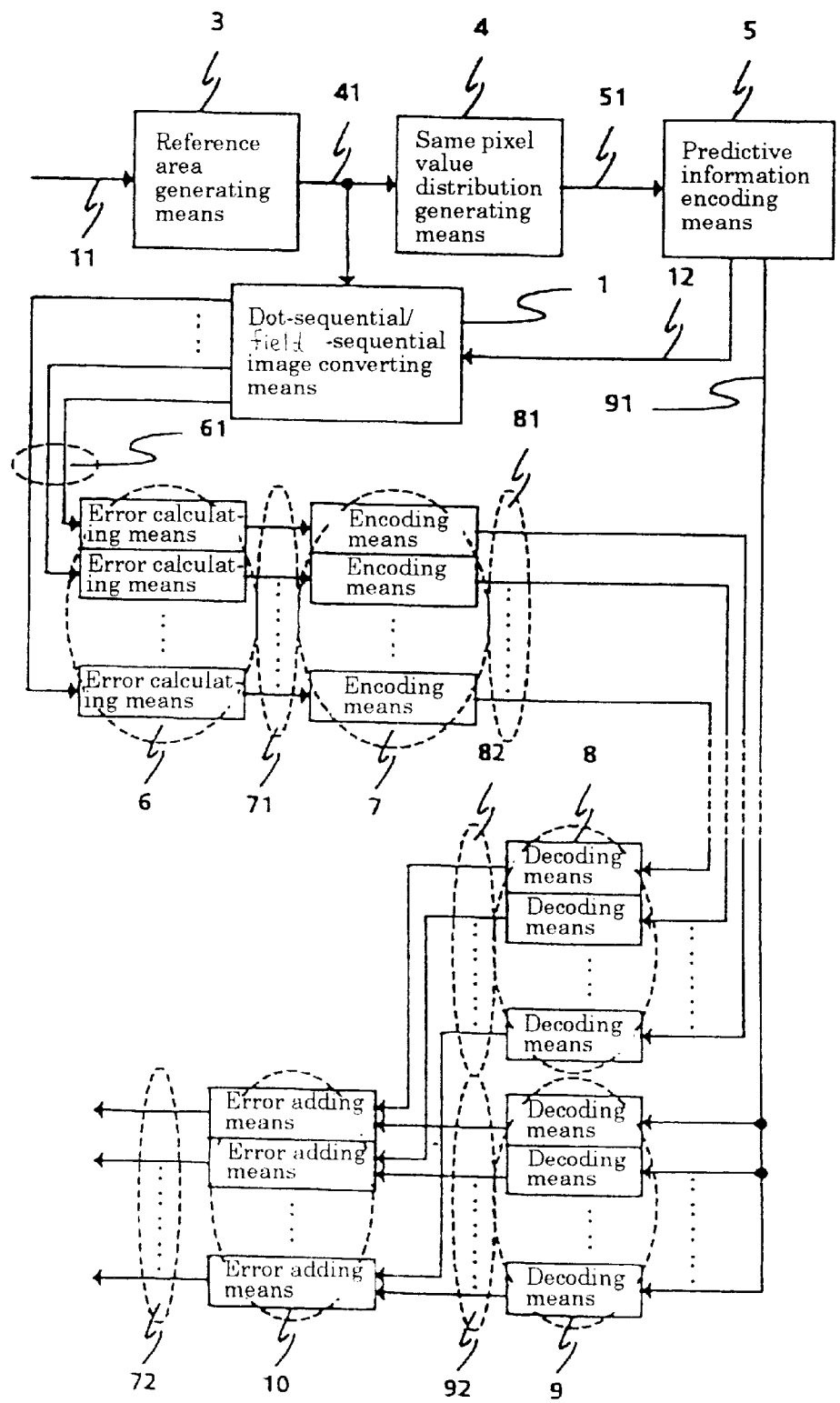
FIG. 1 is a block diagram showing a color image encoding/decoding apparatus according to the present invention.

The arrangement of the color image encoding/decoding apparatus according to the present invention will be described next. FIG. 1 is a block diagram showing the arrangement of the color image encoding/decoding apparatus. An upper portion of broken lines which show the omission of signal lines indicates an encoding unit, and a lower portion of broken lines indicates a decoding unit. As shown in FIG. 1, the encoding unit of the color image encoding/decoding apparatus includes a dot-sequential/field-sequential image converting means 1, a reference area generating means 3, a same pixel value distributing and generating means 4, a predictive information encoding means 5, a plurality of error calculating means 6, and a plurality of encoding means 7.

The reference area generating means 3 collects encoded pixel data and a plurality of pixel data units at its peripheral area from dot-sequential image data 11 inputted per pixel in the order of raster scanning, for example, and outputs this data as target pixel data and reference area data 41. The same pixel value distributing and generating means 4 detects based on the target pixel data and the reference area data 41 the manner in which pixels having the same pixel value as that of the target pixel are distributed around the target pixel, and outputs the detected result as a same pixel value distribution 51. If the target pixel data 41 can be encoded only by the same pixel value distribution 51, the predictive information encoding means 5 encodes the target pixel value distribution 51 based on the same pixel value distribution 51 and outputs the encoded result as predictive information code data 91. If the target pixel data 41 cannot be encoded only by the same pixel value distribution 51, then the predictive information encoding means 5 generates a code that the data cannot be encoded, and outputs the same as predictive information code data 91. Further, the predictive information encoding means 5 outputs data indicating whether or not data can be encoded or not as an encoded result signal 12.

When the dot-sequential/field-sequential image converting means 1 is informed by the encoded result signal 12 whether data cannot be encoded only by the pixel value distribution, it converts the pixel data 41 from the dot-sequential system to the field-sequential system, and outputs the data thus converted as the field-sequential system pixel value data 61. The predictive error calculating means 6 calculates a predictive pixel value from pixel value data, further calculates an error between the predictive pixel value and the field-sequential system pixel value data 61, and outputs the error thus calculated as a predictive error 71. The predictive error encoding means 7 encodes the predictive error 71 and outputs the encoded error as field-potential system predictive error code data 81.

A decoding unit of the color image encoding/decoding apparatus includes a plurality of predictive error decoding means 8, a plurality of decoding means 9 for predictive information encoding, and a plurality of error adding means 10.

The predictive error decoding means 8 decodes the predictive error code data 81 and outputs decoded data as a predictive error 82. Then, the predictive error adding means 10 calculates a predictive pixel value based on the predictive information 92, adds the predictive error 82 to the predictive pixel value in response to predictive information and outputs an added result as the pixel value data 72.

According to the above-mentioned arrangement, since the dot-sequential/field-sequential image conversion is not executed as the pre-processing of the encoding but executed at a high speed as the internal processing of the encoder, the encoding processing time can be reduced. Further, since the same pixel value distribution is detected and the predictive information is encoded at a time independently of the number of fields of the image, the encoding processing time can be reduced. Moreover, since there is only one predictive information signal independently of the number of the fields of the image, it can be expected that the encoding amount can be reduced. Furthermore, since there are only one reference area generating means 3, one same pixel value distributing and generating means 4 and one predictive information encoding means 5 independently of the number of the fields of the image, the circuit arrangement can be simplified.

Then, an operation upon encoding will be described.

Figure 2:
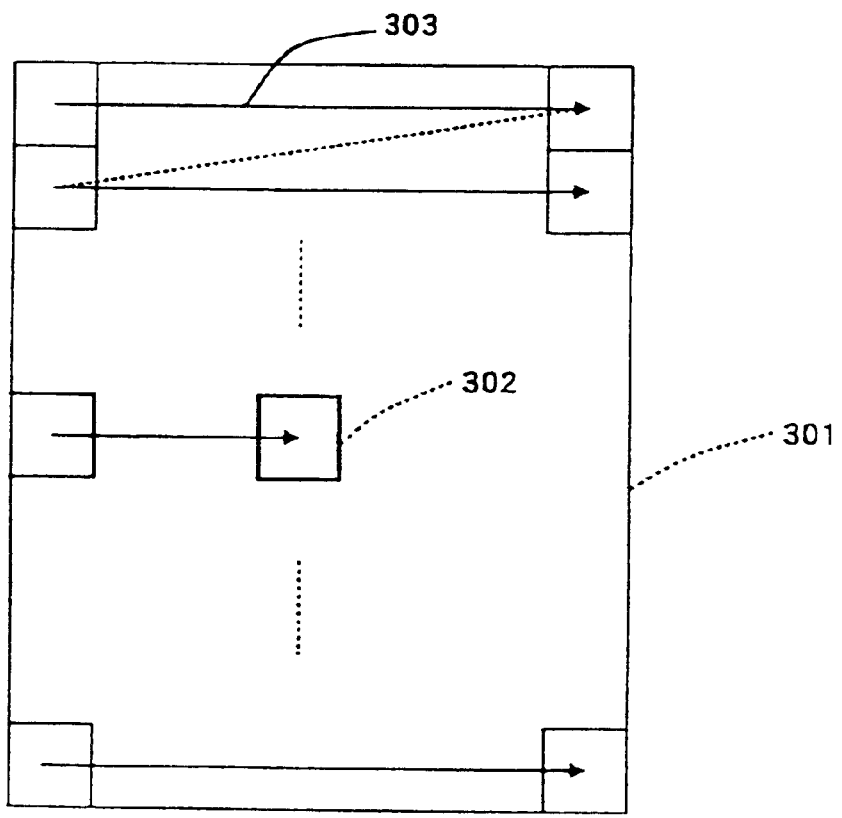
FIG. 2 is a diagram used to explain image data.

Dot-sequential system image data 11 is a flow of pixel data 302 obtained when image data 301 of one page is sequentially scanned by an arrow 303 as shown in FIG. 2, for example. A pixel value is sequentially inputted to the reference area generating means 3. The reference pixel area (including a target pixel) results from the dot-sequential system image data 11 from collecting the pixel value of the encoded pixel 304 and pixels around the pixel 304, e.g. pixel values of surrounding four pixels 305. The reference area generating means 3 outputs these pixel values as target pixel data and the reference area data 41. The encoded pixel is sequentially scanned within one page similarly to the scanning order of the pixels shown in FIG. 2.

Figure 3:
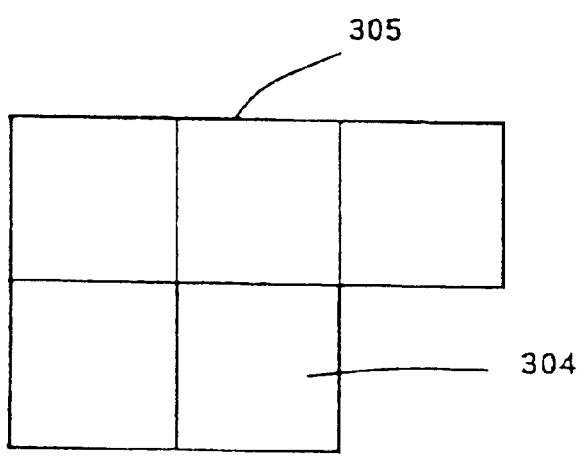
FIG. 3 is a diagram used to explain reference area data.

The same pixel value distributing and generating means 4 compares the target pixel data and the same pixel value in the reference area data 41 based on the target pixel data and the reference area data 41, and outputs the compared result as the same pixel value distribution 51. In the example shown in FIG. 3, the surrounding pixels having the same pixel value as that of the target pixel are replaced with 1 and other surrounding pixels are replaced with 0. Then, the replaced surrounding four pixels are collected and outputted as the same pixel value distribution 51. That is, when reference data is a pixel value 306 shown in FIG. 4, there is generated a same pixel distribution 307 in which the right above and the left-hand side of the target pixel become 1.

Figures 4, 5:
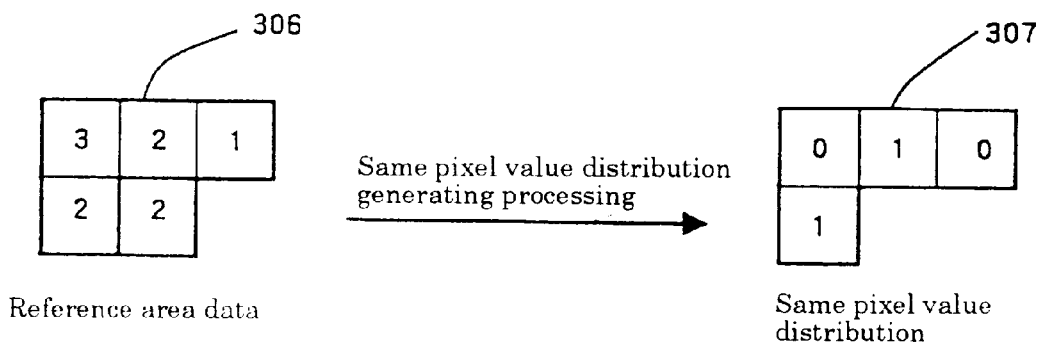
FIG. 4 is a diagram used to explain reference area data and same pixel value distribution.
FIG. 5 is a diagram used to explain the manner in which a predictive information code is generated.

The predictive information encoding means 5 encodes data as shown on an encoding generation table 309 in accordance with the labeling of the reference pixel label 308 shown in FIG. 5, and outputs encoded results as predictive information code data 91 and the encoded result signal 12.

The dot-sequential/field-sequential image converting means 1 receives the encoded result from the encoded result signal 12, and when encoding is impossible, the dot-sequential/field-sequential image converting means 1 converts the dot-sequential system image data 41 into the field-sequential system image data, e.g. four field-sequential image data of K, Y, M, C, and then outputs this data as fieldsequential pixel value data 61. The predictive error calculating means 6 calculates a predictive error as in the equation 311 by use of A and B in 310 of FIG. 6, for example, as a reference pixel and X as a target pixel from the inputted field-sequential system pixel value data 61, and outputs a calculated predictive error as the predictive error 71.

The predictive error encoding means 7 encodes the inputted predictive error 71 in accordance with the arithmetic encoding system, for example, and then outputs the predictive error code data 81.

Then, an operation upon decoding will be described. The predictive error decoding means 8 decodes the inputted predictive error code data 81 in a decoding system corresponding to the encoding system of the predictive error encoding means 7, and outputs an encoded result as the predictive error 82. The predictive information decoding means 9 decodes the inputted predictive information code data 91 in accordance with a decoding system corresponding to the encoding system of the predictive information encoding means 5, and then outputs an encoded result as the predictive information 92. The predictive error adding means 10 predicts a pixel value from the inputted predictive information 92, adds the predictive error 82 to the predictive pixel value in response to the predictive information 92, and then outputs the pixel value data 72.

Another arrangement of the present invention will be described next. In this arrangement, the number of fields of the dot-sequential/field-sequential image conversion is not fixed previously and may be varied from the outside. When the number of fields designated from the outside does not reach the maximum number of fields that can be converted, a part of the target pixel value is varied by a predetermined method and then outputted. That is, this arrangement includes the pixel value converting means for varying and outputting a part of the target pixel value by a predetermined method when the number of the fields designated from the outside does not reach the maximum number of the fields that can be converted.

According to this arrangement, since the pixel data at the field which is not used can be held at a fixed value and has no redundancy, as compared with the case in which an exclusively-designed encoder corresponding to the number of fields is used, there can be achieved a processing speed and an encoding amount that are equivalent.

The present invention will hereinafter be described in detail with reference to the following embodiments.

[Embodiment 1]

Figure 7:
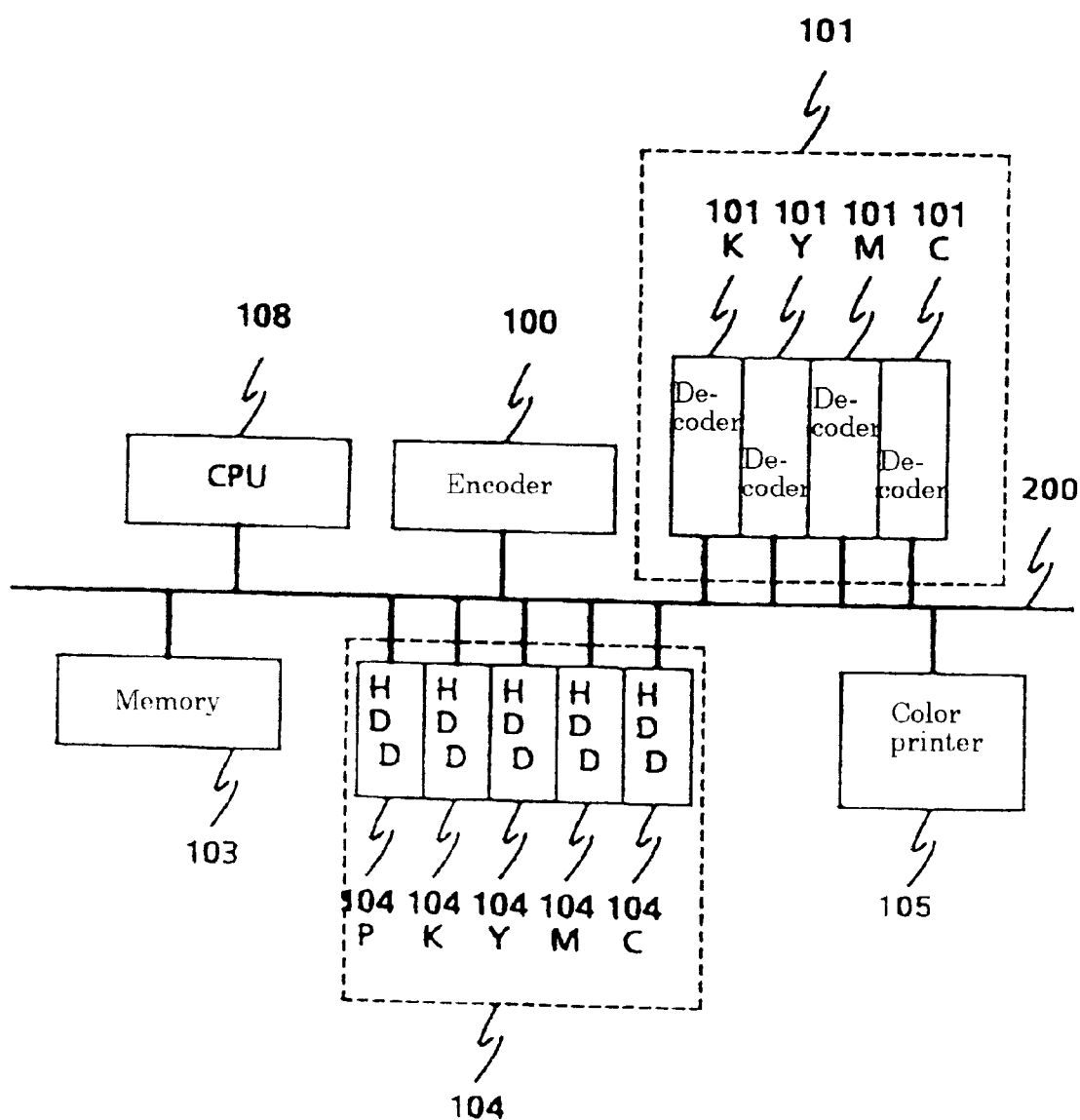
FIG. 7 is a block diagram showing the arrangement of the embodiment 1.

FIG. 7 shows an example in which an apparatus for outputting a color image to a color printer is arranged by use of the color image encoding/decoding apparatus according to this invention. In the embodiment 1, the predictive information is calculated in the data form of the dot-sequential system, and hence the encoding processing time can be reduced considerably.

In FIG. 7, reference numeral 100 designates an encoder in which a dot-sequential system image is set to an input signal and a field-sequential system image is set to an output signal. Reference numeral 101 designates a decoder in which a field-sequential system image and predictive information, which will be described later on, are set to input and output signals. Here, the color image is comprised of four colors of K, Y, M, and C. Since four fields are to be decoded, there are required four decoders 101.

When an image is outputted to a printer in FIG. 7, the work is separated into the first-stage processing and the second-stage processing.

The first-stage processing is executed until the image is accumulated in the HDD 104, and the procedure thereof is substantially similar to those of the conventional examples 2 and 3. However, it is different from those of the conventional examples 2 and 3 in that predictive information is encoded before the encoder 100 converts the dot-sequential system image into the field-sequential system image.

Figure 8:
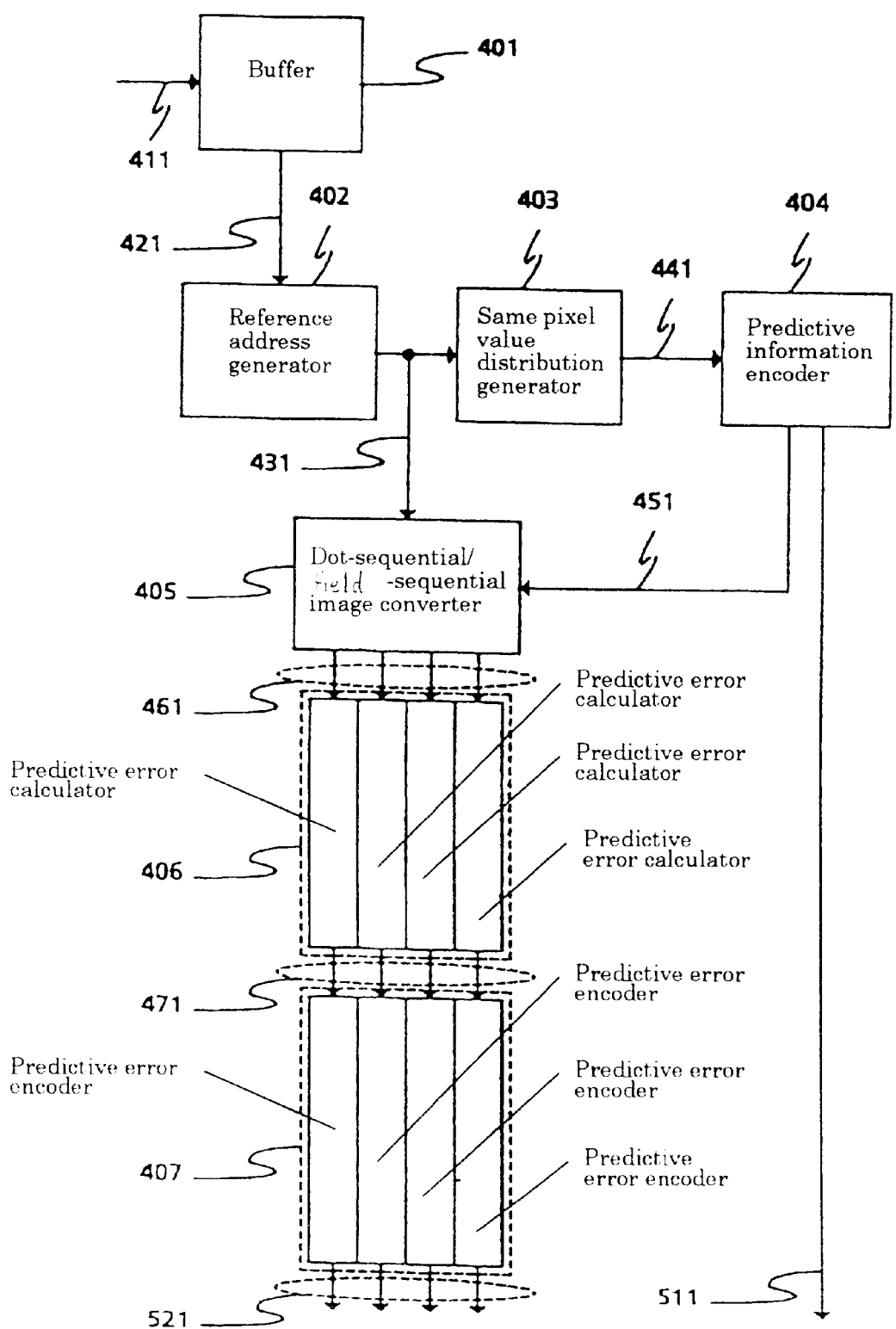
FIG. 8 is a block diagram showing the arrangement of the encoder according to the embodiment 1.
Figure 9:
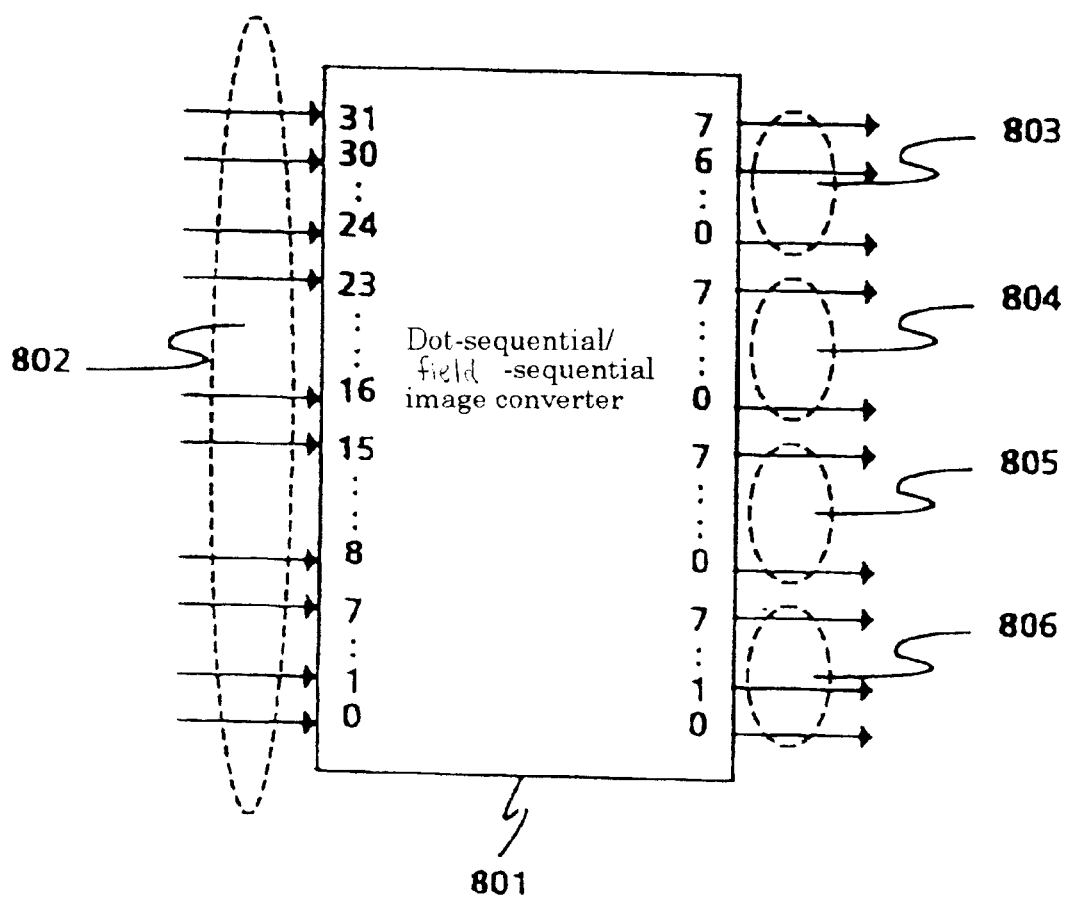
FIG. 9 is a block diagram showing the arrangement of a dot-sequential system to a field-sequential system converter.

The encoder 100 will be described next. FIG. 8 shows the encoder 100. As shown in FIG. 8, the encoder. 100 comprises a buffer 401, a reference address generator 402, a same pixel value distributor and generator 403, a predictive information encoder 404, a dot-sequential/field-sequential image converter 405, a plurality of predictive error calculators 406, and a plurality of predictive error encoders 407. In this arrangement, initially, image data 411 of the dot-sequential system is read out, and target pixel value data and reference are a pixel value data 431 are extracted by the reference address generator 402. The reference areas, for example, are four pixels of the reference area data 305 in FIG. 3. It is detected by the same pixel value distributor and generator 403 whether or not pixels having pixel value equal to that of the target pixel value exist in the reference area. If there is the pixel having the pixel value equal to the target pixel value, then such pixel can be decoded by predictive information which will be described later on. Thus, the predictive information encoder 404 encodes only the predictive information and outputs the predictive information thus encoded as predictive information code 511. If there is no pixel having the pixel value equal to that of the target pixel value, then a code indicative of the absence of the corresponding pixel is outputted as the predictive information code 511, and further a predictive error which will be described later on is encoded. The predictive information code is generated, for example, by use of a code generation table of FIG. 5. For example, if A of a reference pixel label 308 agrees with the target pixel value, then the predictive information code goes to "1" from the code generation table 309. If neither A nor B agrees with the target pixel value but C agrees with the target pixel value, then the predictive information code becomes "001". If none of A to D agrees with the target pixel value, then the predictive information code becomes "000", and further, in order to encode the predictive error, predictive error data that should be encoded is outputted to the dot-sequential/field-sequential image converter 405 through the signal line 451. FIG. 9 shows an example of the dot-sequential/field-sequential image converter. A dot-sequential/field-sequential image converter 801 divides a dot-sequential system pixel 802 into pixels 803, 804, 805, 806 of respective fields of K, Y, M, C in the order of upper 8 bits, and outputs these pixels to respective predictive error calculators 406. The predictive error calculators 406 calculate the predictive errors as shown in FIG. 6, for example, and output the thus calculated predictive errors to the respective encoders 407 as predictive errors 471. The encoder 407 executes an arithmetic encoding, for example, and outputs the thus encoded data as a predictive error code 521. Here, the writing of the predictive error code data need not be delayed until data of the whole field is finished, and the writing of the predictive error code data is started from the field of which the encoding is finished. There are five HDDs 104, and an HDD 104K, an HDD 104Y, an HDD 104M, an HDD 104C, and an HDD 104P correspond to the respective fields of K, Y, M, C and predictive information (FIG. 7).

The succeeding stage is executed until an image is outputted from the HDD 104 to the printer 107. The succeeding stage is different from those of the conventional examples 2, 3 in that predictive information and predictive error are separated from each other.

Figure 10:
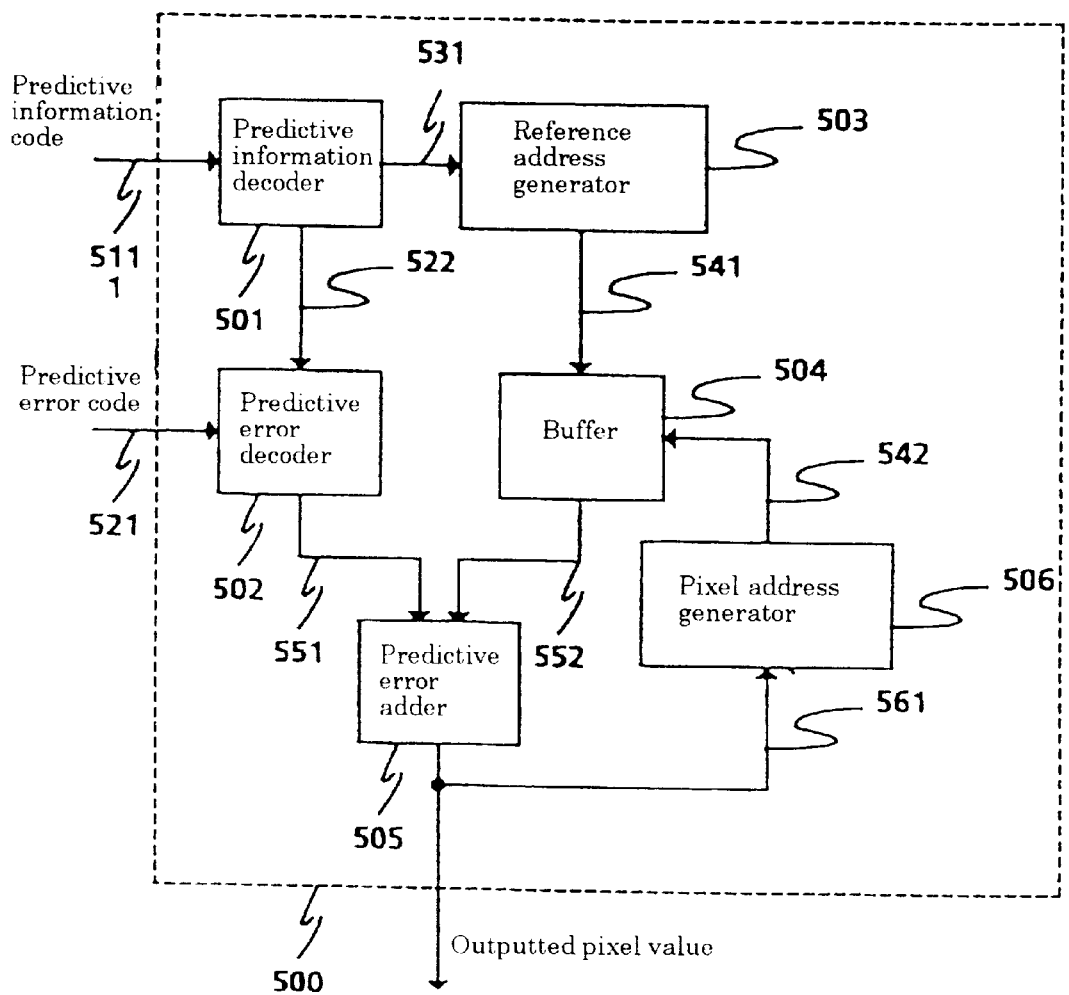
FIG. 10 is a block diagram showing the arrangement of a decoder according to the embodiment 1.

The decoder 101 will be described next. FIG. 10 shows a decoder 500 which makes an example of the decoder 101 (101K, 101Y, 101M, 101C). In FIG. 10, the decoder 500 corresponds to the respective decoders 101K, 101Y, 101M, and 101C. As shown in FIG. 10, the decoder 500 includes a predictive information decoder 501, a predictive error decoder 502, a reference address generator 503, a buffer 504, a predictive error adder 505, and a pixel address generator 506. The decoder 500 decodes data based on the predictive information code data 511 and the predictive error code data 521. The predictive information decoder 501 decodes a predictive information code, and if the predictive information code is not "0000", such code can be predicted, then the reference information decoder 501 informs reference code to the reference address generator 503. The reference address generator 503 calculates the reference pixel address and informs the buffer 504 of the reference pixel address. The buffer 504 outputs a final pixel value 561 through the predictive error adder 505. If the predictive information code is "0000", then such code cannot be predicted so that two of predictive pixel value and predictive error are calculated. Initially, when the predictive pixel value is calculated, in order to calculate the predictive error as shown in FIG. 6, for example, the reference address generator 503 calculates the reference pixel address 541 by use of A and B of 310 as reference pixels, and informs the buffer 504 of the reference pixel address 541. The buffer 504 outputs the pixel values 552 of A and B to the predictive error adder 505. Then, the predictive error adder 505 calculates (A+B)/2, and sets a calculated value as a predictive pixel value. On the other hand, the predictive error 551 is generated when the predictive error decoder 502 decodes the predictive error code 521. The predictive error 551 is outputted to the predictive error adder 505. The predictive error adder 505 adds the predictive error 551 to the pixel value 552 when the predictive error 551 is inputted, and then outputs an added result as a final pixel value 561. The outputted pixel value is fed back to the buffer 504 regardless of whether it can be predicted or not predicted. In that case, the pixel address generator 506 generates the address and outputs the thus generated address to the buffer 504 as the target pixel value and the address 542.

The encoding processing time obtained according to this system is compared with that of the conventional example 2. Assuming that n is the number of fields of a target image, q is a mistake ratio of a predicting device, Tp is an average encoding time of predictive information and Te is a predictive error encoding time, then a processing time T1 of the conventional example 2 is expressed as:

$$n(Tp+qTe)$$

A processing time T2 of this system is expressed as:

$$Tp+nqTe$$

If $Tp/Te=\alpha$, then a processing time ratio R of this system and the conventional example 2 is expressed as:

$$R=T2/T1$$
$$=(Tp+nqTe)/n(Tp+qTe)$$
$$=(\alpha+nq)/n(\alpha+q)$$

Figure 11:
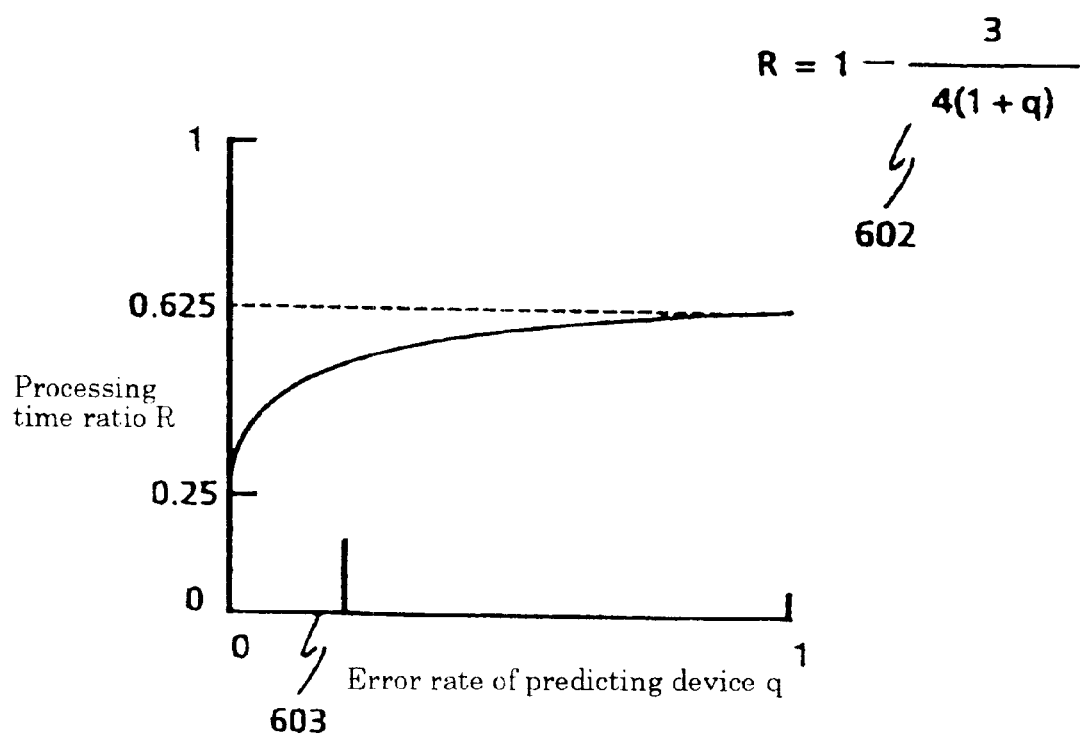
FIG. 11 is a diagram used to explain the manner in which the processing time of this invention and the processing time according to the conventional example are compared with each other.

602 in FIG. 11 shows R obtained when n=4 and $\alpha=1$, and 603 shows the behavior thereof. As the mistake ratio of the predicting device approaches 0, the processing time approaches ¼ of the conventional example 2. From this aspect, it becomes clear that the encoding processing time of this invention can be improved.

Figure 12:
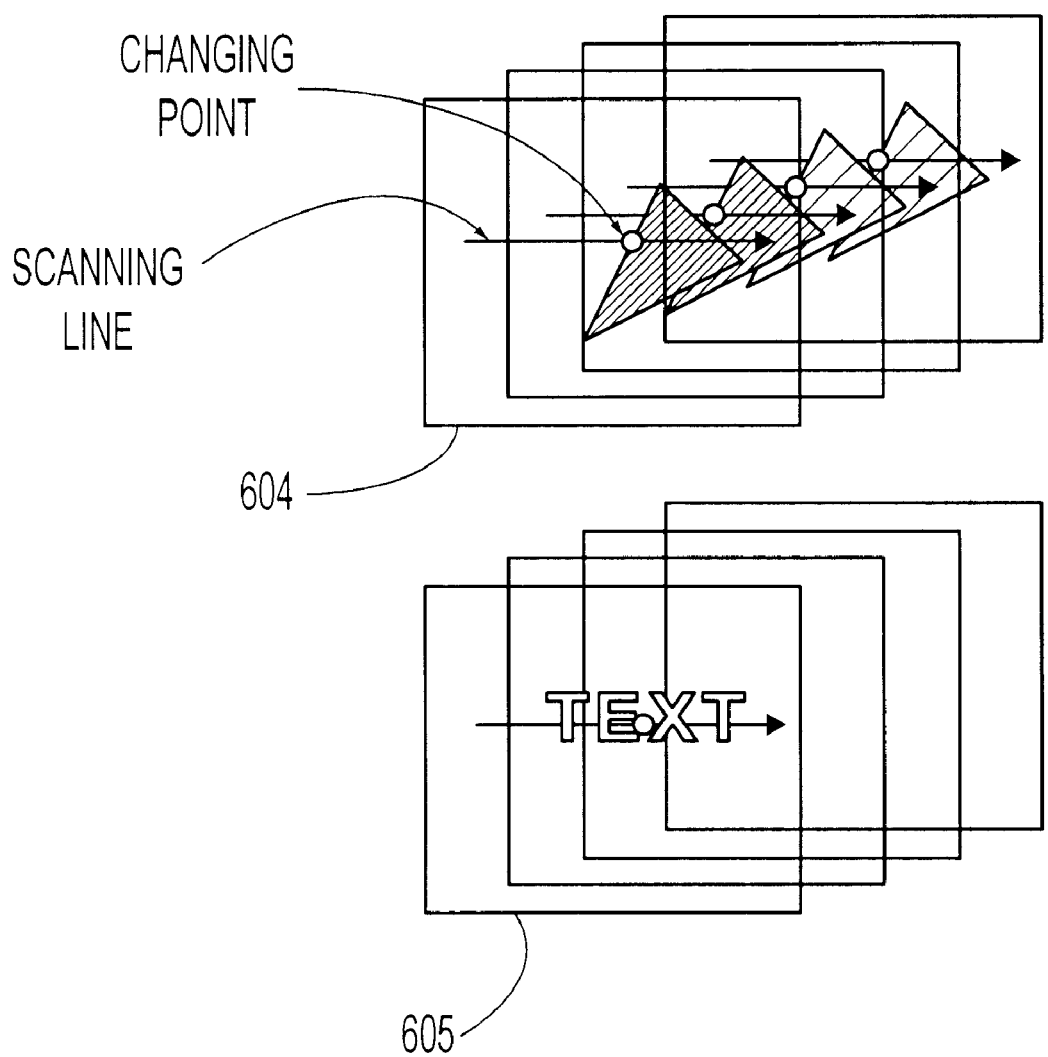
FIG. 12 is a diagram used to explain the manner in which the compression ratio of this invention and the compression ratio according to the conventional example are compared with each other.

Let us consider the improvement of the compression ratio according to this embodiment. FIG. 12 shows an example of an image. In FIG. 12, reference numeral 604 denotes a KYMC color graphic image, and reference numeral 605 denotes KYMC color character information. In the graphic image 604, since the predictive information of all fields are exactly the same, the predictive information encoding amount is reduced to ¼ as compared with the predictive information of the conventional system. Conversely, in the character information 605, since only the K field is changed, predictive information code on the Y, M, C fields according to the conventional system are almost 0. Thus, in the example of 605, there is substantially no difference between the compressing ratio of the conventional system and the compression ratio of this system. Accordingly, although the compression ratio is not always improved, it is clear that the compression ratio can be improved considerably depending on the image.

[Embodiment 2]

Figure 13:
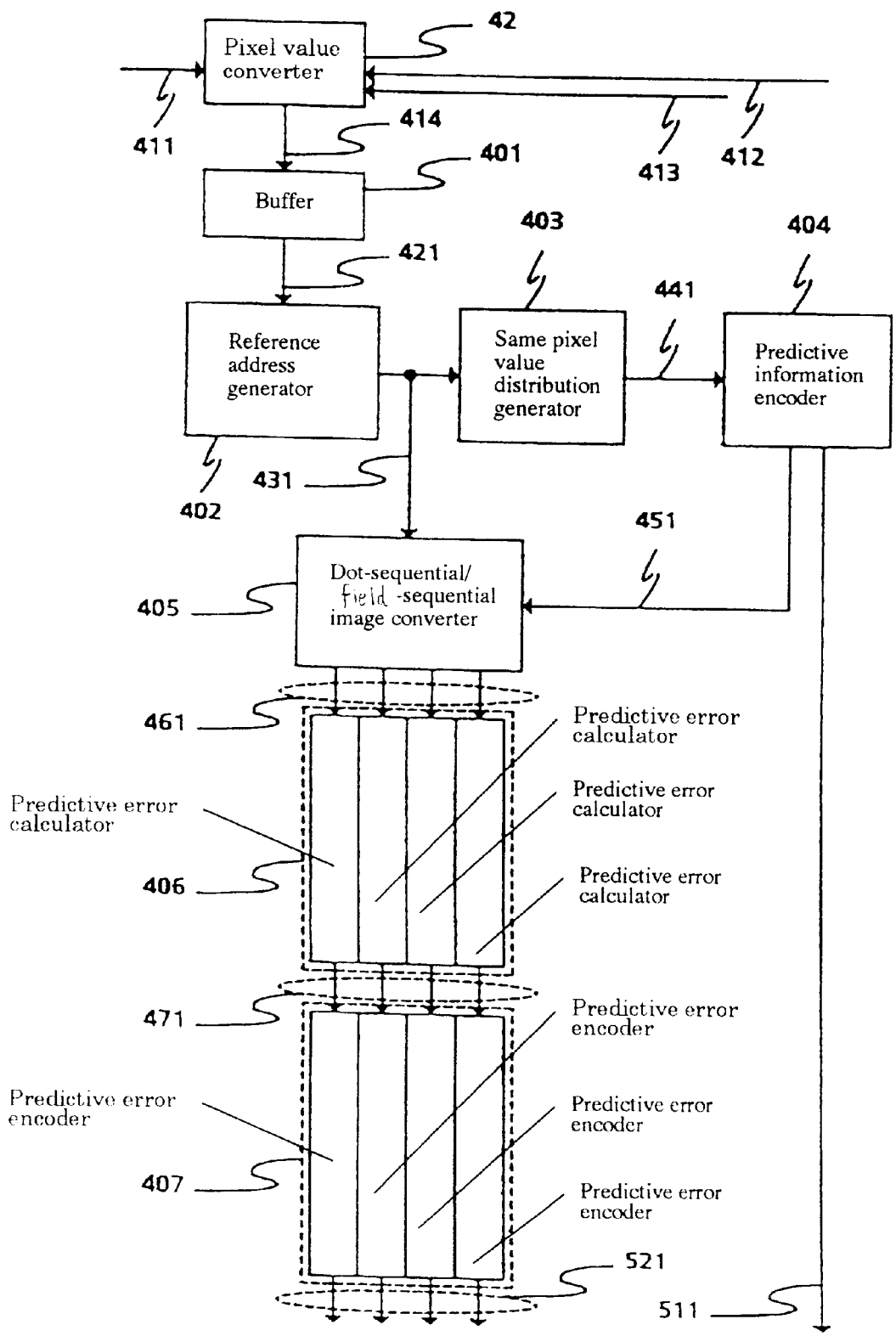
FIG. 13 is a block diagram showing the arrangement of an encoder according to an embodiment 2.

FIG. 13 shows an example of the arrangement of the embodiment 2 according to this invention. The arrangement of FIG. 13 is different from the arrangement of FIG. 8 in that a pixel value converter 42 is provided before inputted dot-sequential system image data is written in the buffer. In FIG. 13, like elements and parts corresponding to those of FIG. 8 are marked with the same references.

Figure 14:
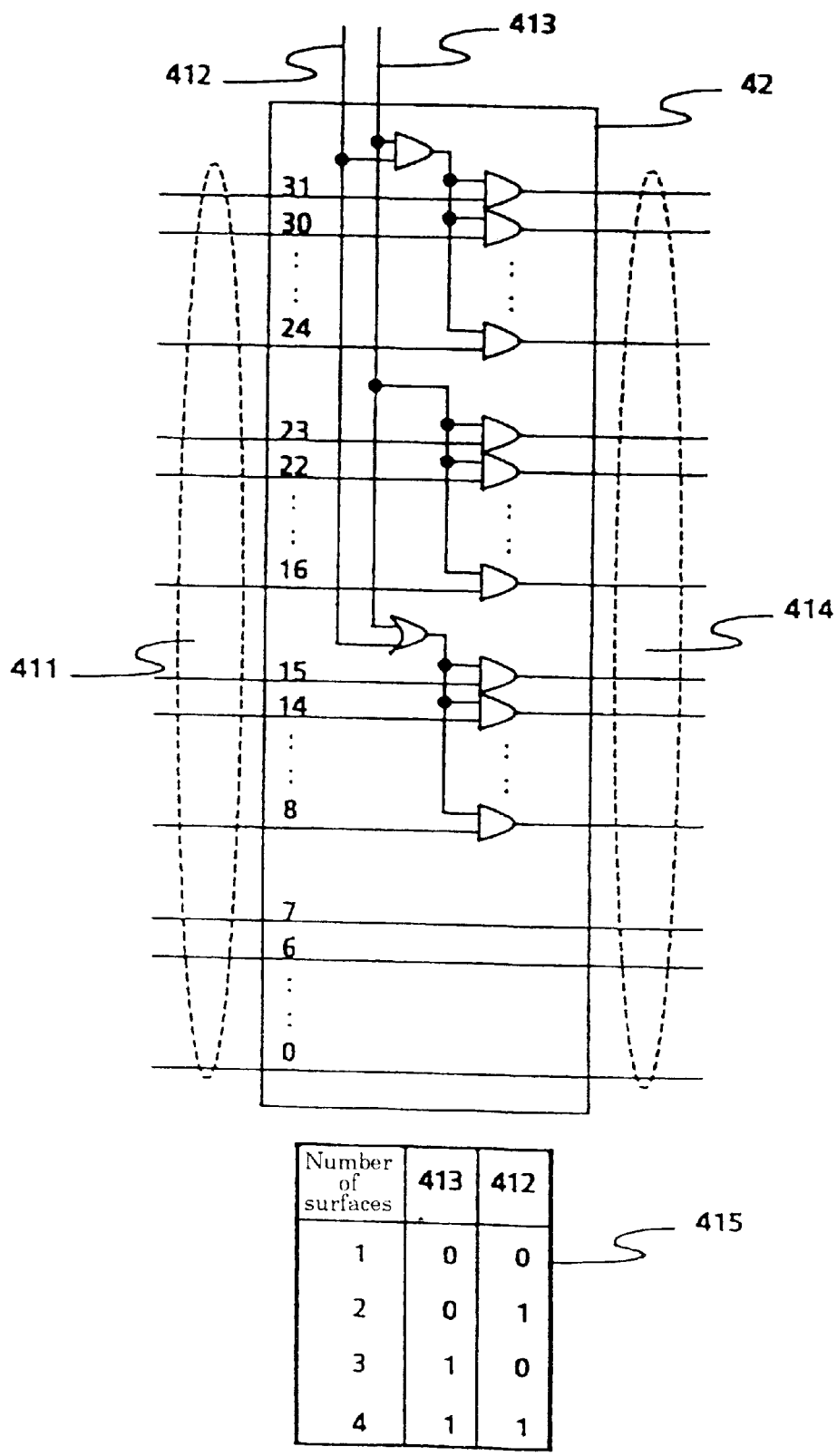
FIG. 14 is a circuit diagram showing an example of the arrangement of a pixel value converter according to the embodiment 2.
Figure 15:
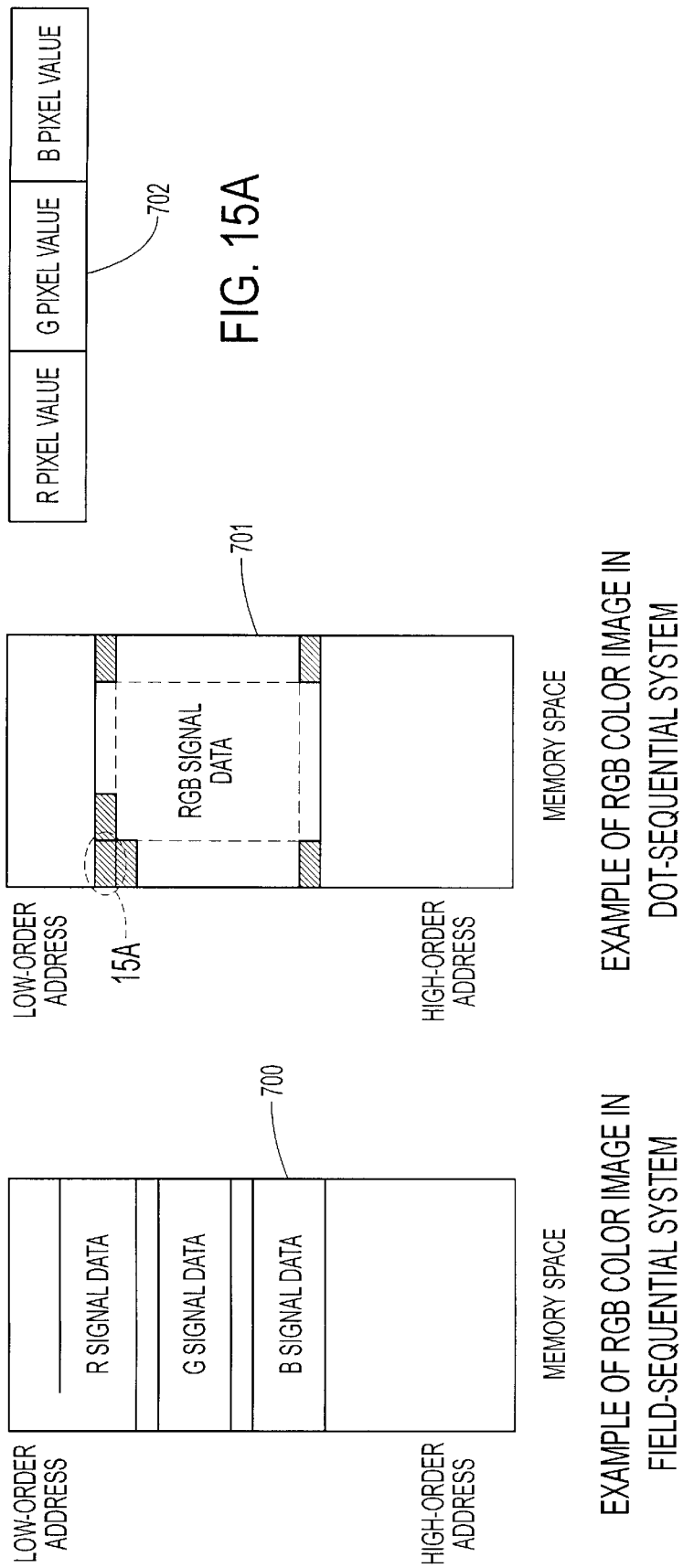
FIG. 15 is a diagram used to explain color image data of a dot-sequential system and a field-sequential system.
Figure 16:
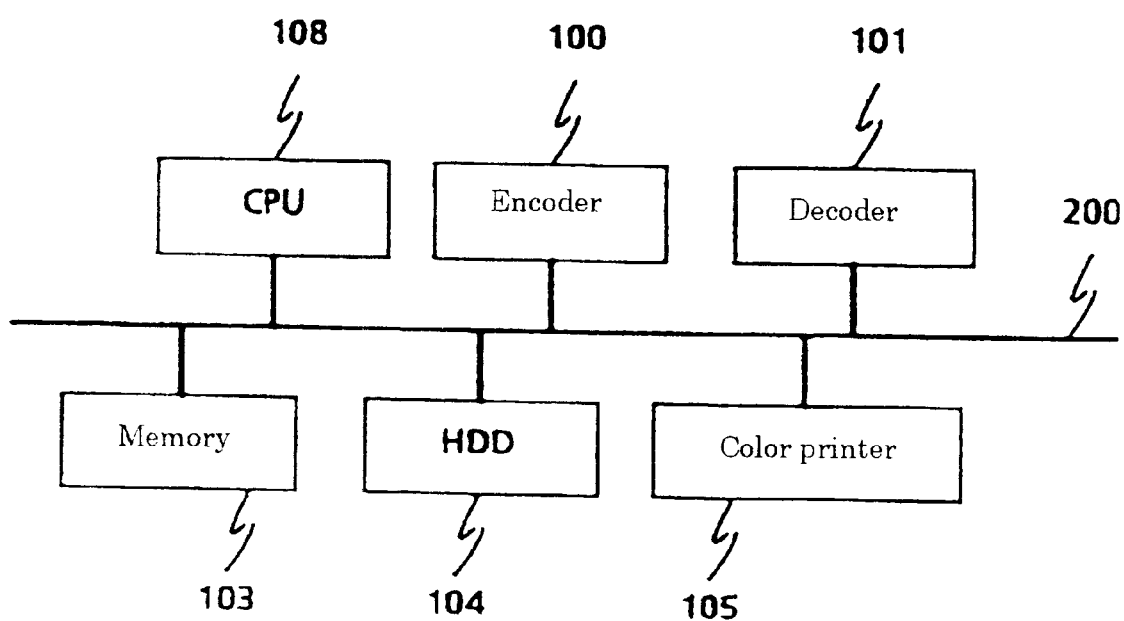
FIG. 16 is a block diagram showing a conventional example of an image encoder/decoder.
Figure 17:
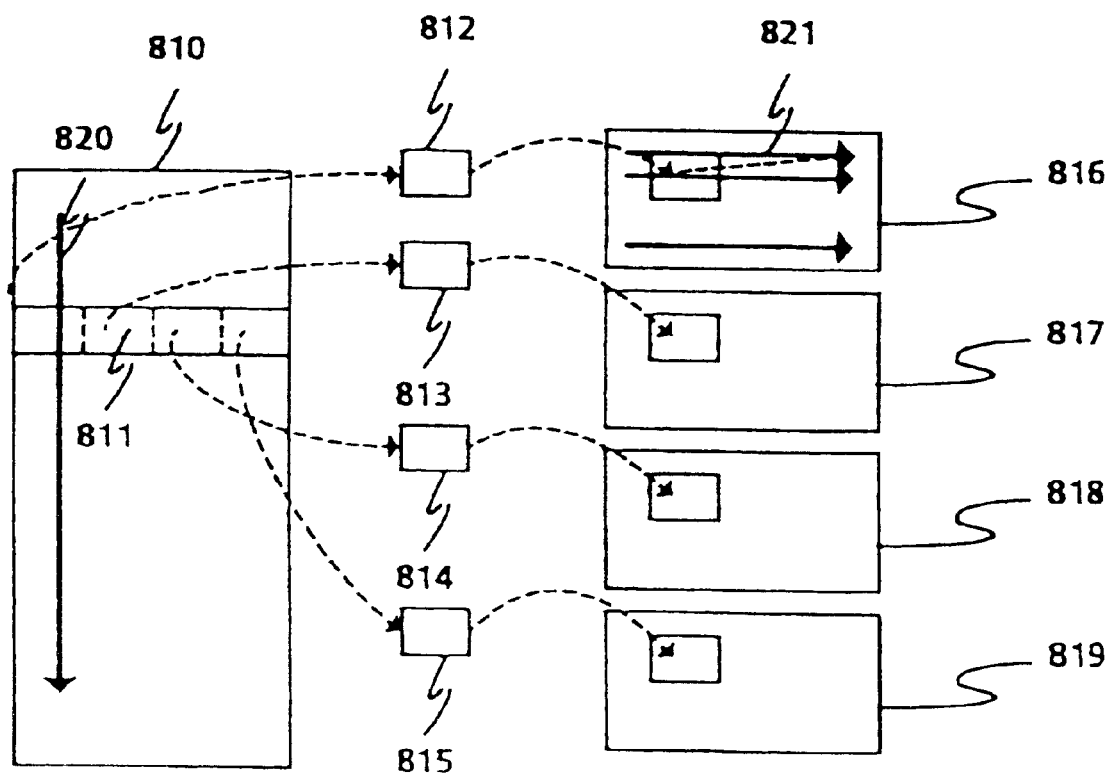
FIG. 17 is a diagram used to explain the manner in which image is converted from the dot-sequential system into the field-sequential system.
Figure 18:
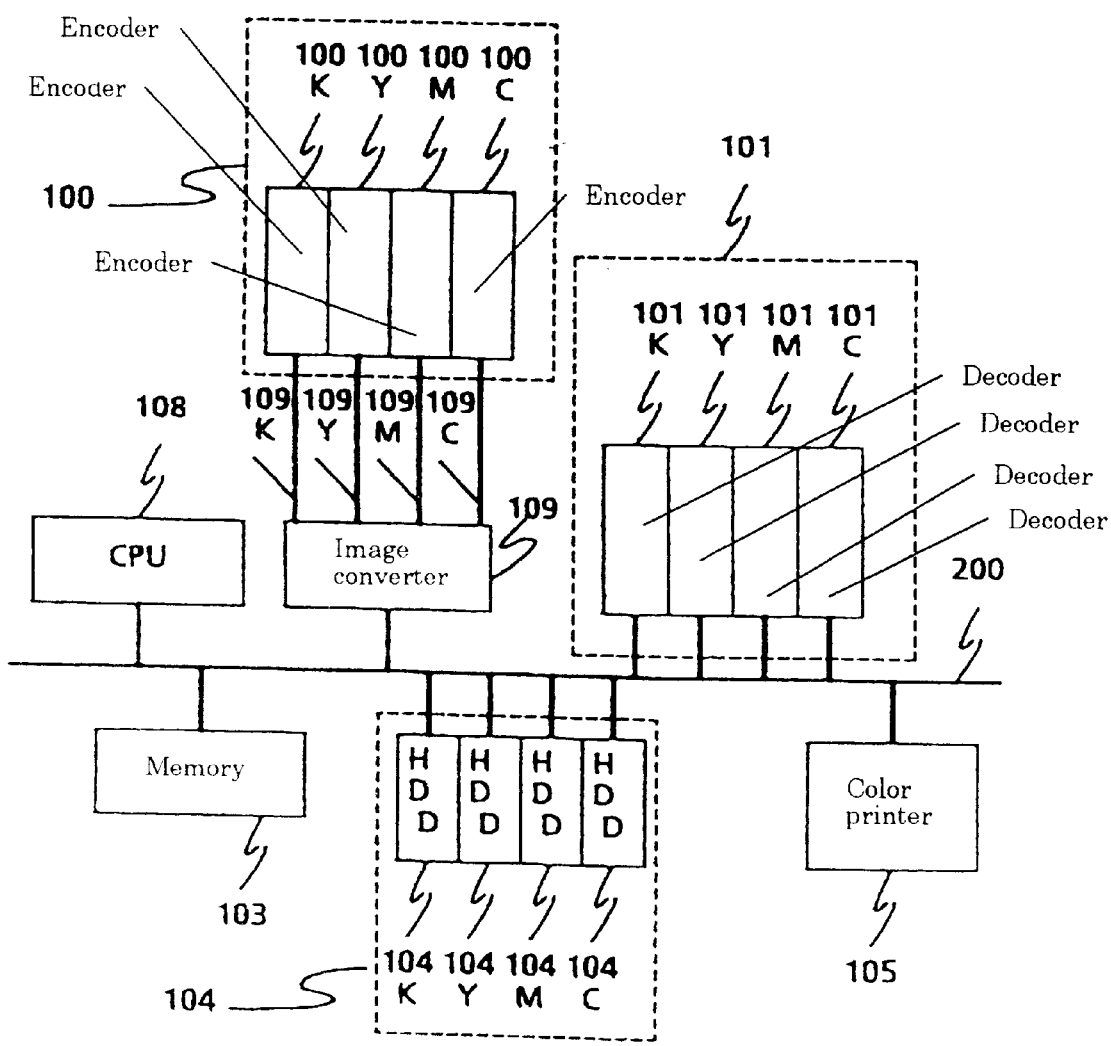
FIG. 18 is a block diagram showing another conventional example of the image encoder/decoder.
Figure 19:
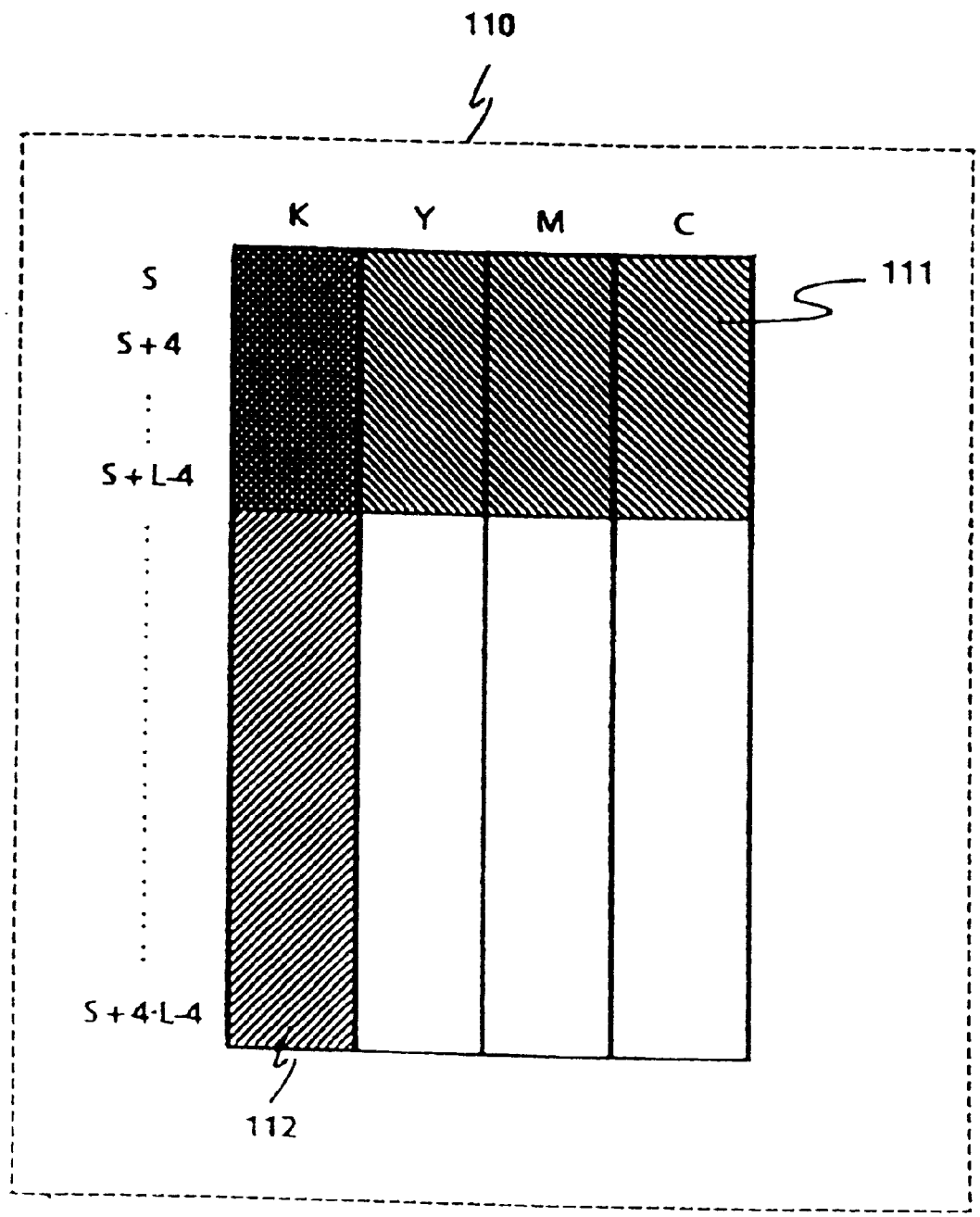
FIG. 19 is a diagram used to explain a dot-sequential/field-sequential image converter.

FIG. 14 shows an example of the arrangement of the pixel value converter 42 shown in FIG. 13. As shown in FIG. 14, although the pixel value converter 42 receives a dot-sequential system pixel value from a signal line 411 and outputs the same from a signal line 414, the pixel value converter 42 is operated in such a manner as to mask data of a field which becomes unnecessary when dot-sequential data is converted into field-sequential data. The number of fields of the converted data is designated by signal lines 412, 413 as shown on a table 415, for example. In this example, the output 414 of the pixel value converter 42 when the number of the fields is four becomes the same as that of the embodiment 1. When the number of the fields is three, the signal line 412 becomes 0 so that 24 to 31 bits of the outputted pixel value 414 become 0 constantly. Similarly, when the number of the fields is two and one, respective 16 to 31 bits and 8 to 31 bits of the output pixel value 414 become constantly 0.

With reference to the specific operation example, let it be demonstrated that the efficiency is not lowered when a four-field encoder, for example, is used as a three-field encoder. At that time, 24 to 31 bits of the output pixel value 414 become constantly 0. This corresponds to a pixel value of the K field when the dot-sequential/field-sequential conversion will be executed later on, and the pixel value of the K field becomes 0 constantly. Thus, for only the K field, the pixel value can constantly be predicted, and a predictive error constantly becomes 0. Considering remaining three fields, there are established the following two points: (1) Since the pixel value on the K field can be constantly predicted, when pixel values of other remaining fields can be predicted, the pixel values becomes always predictable; and (2) Although a pixel value of any one of the fields cannot be predicted, the predictive error at the K field is constantly 0 so that the encoding amount of the K field becomes almost 0.

Thus, when the four-field encoder is used as the three-field encoder, the operation of the predictive information encoder does not change at all. Also, the predictive error calculator does not substantially generate a code with respect to the K field. Therefore, as compared with the case in which the three-field encoder is used, it is to be noted that the processing speed and the encoding amount hardly change.

As described above, it is clear that, when this pixel value converter is used, even though the number of the fields is reduced, the efficiency can be prevented from being lowered.

According to the encoding/decoding apparatus of the present invention, the image encoding and decoding processing time can be reduced. The encoding processing time can be reduced for the following two reasons:

The first reason is that the dot-sequential/field-sequential image conversion is not required as the pre-processing of the encoding. When the dot-sequential system image is outputted to the apparatus of the field-sequential system, according to the prior art, it is frequently observed that the dot-sequential/field-sequential image conversion is required as the pre-processing of the encoding. However, according to the present invention, since the dot-sequential/field-sequential image conversion is incorporated in the encoding processing, the conversion processing is not necessary. Thus, the encoding processing time can be reduced.

The second reason is that the encoding amount can be reduced by effectively utilizing correlation between the respective fields of the color image. To be specific, since predictive information of all fields is encoded at a time, it can be expected that, as compared with the case in which predictive information of respective fields is separately encoded, the encoding amount of predictive information can be reduced. In the case of the four fields of K, Y, M, C, for example, it can be expected that, as compared with the case in which predictive information of respective fields is separately encoded, the encoding amount can be reduced to ¼ at the minimum. As a result, the data input and output time can be reduced, and the encoding and decoding time also can be reduced.

Further, in this invention, when a predetermined pixel value converter is used, if the number of the fields is less than the maximum number of the fields that can be encoded, then image data of various number of fields can be encoded without modifying the encoding apparatus.

Having described preferred embodiments of the invention with reference to the accompanying drawings, it is to be understood that the invention is not limited to those precise embodiments and that various changes and modifications could be effected therein by a person skilled in the art without departing from the spirit or scope of the invention as defined in the appended claims.

What is claimed is:

1. A color image encoding apparatus for encoding first color image data which is not divided per color element but handled as single data in such a manner that said first color image data can be decoded as second color image data which is handled as a plurality of data sets for respective color elements, said color image encoding apparatus comprising:

reference area generating means for collecting from said first color image data a color pixel value of a target pixel to be encoded and a plurality of color pixel values at a peripheral region of said color pixel value by scanning said first color image data and outputting these color pixel values as reference area data;

same pixel distributing and generating means for detecting on the basis of said reference area data the manner in which pixels having the same color pixel value as that of said target pixel are distributed around said target pixel and outputting a detected result as the same pixel value distribution;

predictive information encoding means for determining pixel value predictive information based on said pixel value distribution and outputting said pixel value predictive information as a predictive information code;

pixel value converting means for converting the pixel value of said first color image data into a pixel value per color element and outputting a target pixel value per color element;

pixel value predicting means for predicting a target pixel value per color element to be encoded from pixel values of corresponding color elements within a reference area and outputting said target pixel value as a predictive pixel value per color element;

predictive error calculating means for calculating and outputting a predictive error between a target pixel value per color element and a predictive pixel value of said corresponding color element; and predictive error encoding means for encoding a predictive error per color element and outputting the encoded predictive error as a predictive error code.

2. A color image decoding apparatus for receiving a code generated by said image encoding apparatus as claimed in claim 1 as an input signal and decoding said code into second color image data handled as a plurality of data sets for respective color elements, said color image decoding apparatus comprising:

predictive information decoding means for decoding an inputted predictive information code and outputting said decoded inputted predictive information code as predictive information;

pixel value predicting means provided per said color element and predicting a target pixel value from said predictive information and a pixel value of a reference area to output said predictive target pixel value as a predictive pixel value;

predictive error decoding means provided per color element for decoding an inputted predictive error code to output said decoded inputted predictive error code as a predictive error; and predictive error adding means provided per color element for adding said predictive pixel value and said predictive error to output an added value as a target pixel value.

3. The image data encoding apparatus according to claim 1, further comprising means for designating the number of color elements of said first color image data and means for converting the pixel value of said first color image data into pixel value corresponding to a maximum color element number when said designated color element number does not reach said maximum color element number that can be decoded.

4. A color image encoding apparatus for encoding first color image data which is not divided per color element but handled as single data in such a manner that said first color image data can be decoded as second color image data which is handled as a plurality of data sets for respective color elements, said color image encoding apparatus comprising:

predictive encoding means for predicting target pixels to be encoded of said first color image data by use of a plurality of predicting devices and outputting identification data of a selected predicting device selected based on a predicted result;

pixel value converting means for converting a value of the target pixel to be encoded of said first color image data into a pixel value per color element and outputting a target pixel value to be encoded per color element when any one of said plurality of predicting devices is not selected;

pixel value predicting means for predicting a target pixel value to be encoded per color element and outputting a predictive pixel value per said color element;

predictive error calculating means for calculating and outputting a predictive error between a target pixel value to be encoded per said color element and a predictive pixel value per said corresponding every color element; and means for outputting encoded data based on identification data of said selected predicting device and a predictive error per said color element.

5. The color image encoding apparatus as claimed in claim 4, wherein said plurality of encoders predict pixels near said target pixel to be encoded as pixels to be encoded.

6. The color image encoding apparatus as claimed in claim 4, wherein a prediction order of said predicting device is used as identification data of said predicting device.

7. The color image encoding apparatus as claimed in claim 6, wherein said prediction order sequence is run-length-encoded.

8. A color image encoding method of encoding first color image data which is not divided per color element but handled as single data in such a manner that said first color image data can be decoded as second color image data which is handled as a plurality of data sets for respective color elements, said color image encoding method comprising the steps of:

a predictive encoding step for predicting target pixels to be encoded of said first color image data by a plurality of predicting devices and outputting identification data of a selected predicting device selected on the basis of a predicted result;

a pixel value converting step for converting a value of the target pixel to be encoded of said first color image data into a pixel value per color element and outputting a target pixel value to be encoded per color element when any one of said plurality of predicting devices is not selected;

a pixel value predicting step for predicting a target pixel value to be encoded per color element and outputting a predictive pixel value of said color element;

a predictive error calculating step for calculating and outputting a predictive error between a target pixel value to be encoded per said color element and a predictive pixel value per said corresponding color element; and a step for outputting encoded data based on identification data of said selected predicting device and a predictive error per said color element.

* * * * *